United States Patent [19]

Lemos Melendez

[11] Patent Number: 5,599,188
[45] Date of Patent: Feb. 4, 1997

[54] DIDACTIC-EDUCATIONAL TOY FOR ELEMENTARY ARITHMETIC OPERATIONS, READING AND WRITING

[76] Inventor: Manuel Lemos Melendez, J. Cadiz Salvatierra, Edificio Malaga-1, P-1, 5° A, Jerez de la Frontera (Cadiz), Spain, 11405

[21] Appl. No.: 383,050

[22] Filed: Nov. 21, 1994

Related U.S. Application Data

[63] Continuation of PCT/RS94/00030, Mar. 22, 1994.

[30] Foreign Application Priority Data

Mar. 23, 1993 [ES] Spain .................................. 9300595
Mar. 7, 1994 [ES] Spain .................................. 9400464

[51] Int. Cl.⁶ .................................................. G09B 23/02
[52] U.S. Cl. .......................................... 434/195; 434/211
[58] Field of Search .................................. 434/164, 208, 434/211, 188, 195; 446/124

[56] References Cited

U.S. PATENT DOCUMENTS

| | | | |
|---|---|---|---|
| 3,208,162 | 9/1965 | Wisdom ................................ | 434/211 |
| 3,359,657 | 12/1967 | Hedberg ............................... | 434/211 |
| 3,423,849 | 1/1969 | Jordan et al. ....................... | 434/188 |
| 3,636,230 | 1/1972 | Tacey ................................... | 434/211 |
| 3,766,667 | 10/1973 | Glassman ............................. | 434/195 |
| 4,177,581 | 12/1979 | Walker . | |
| 4,365,454 | 12/1982 | Davis . | |
| 4,478,583 | 10/1984 | Sellers . | |
| 4,547,160 | 10/1985 | Labelle ................................. | 434/195 |
| 4,645,461 | 2/1987 | Mortensen ........................... | 434/188 |
| 5,013,245 | 5/1991 | Benedict .............................. | 434/211 |
| 5,238,407 | 8/1993 | Pollock ................................ | 434/208 |
| 5,423,682 | 6/1995 | Hildebrandt ........................ | 434/195 |
| 5,433,611 | 7/1995 | Dreyfous ............................. | 434/188 |

FOREIGN PATENT DOCUMENTS

| | | |
|---|---|---|
| 2381544 | 2/1977 | France . |
| 1797252 | 1/1972 | Germany . |
| 2545772 | 4/1977 | Germany . |
| 816076 | 8/1957 | United Kingdom . |
| 1027982 | 2/1964 | United Kingdom . |
| WO89/00069 | 7/1989 | WIPO . |

*Primary Examiner*—Paul J. Hirsch
*Attorney, Agent, or Firm*—Darby & Darby

[57] ABSTRACT

A didactic-educational toy for elementary arithmetic operations includes a plurality of transparent plates. Each of the transparent plates has ten circular orifices. The orifices are distributed symmetrically in two rows. Each row has five of the orifices. Each of the orifices has substantially the same diameter. A plurality of plates each has cylindrical stepped protuberances. Each of the protuberances has a base with a diameter corresponding to a diameter of the orifices of the transparent plates to provide for close-fitting insertion of the base into a corresponding one of the orifices. Each of the protuberances has an upper portion having a diameter smaller than the diameter of its base to facilitate the insertion of the protuberance into a corresponding orifice. The plurality of plates, which have cylindrical stepped protuberances include plates has a different number of protuberances. The surface area of each plate is substantially proportional to the number of protuberances. The plurality of plates, which have cylindrical stepped protuberances include at least a plurality of plates having only one protuberance and a plurality of plates having two protuberances.

15 Claims, 14 Drawing Sheets

A-A

DIDACTIC-EDUCATIONAL TOY FOR ELEMENTARY ARITHMETIC OPERATIONS, READING AND WRITING

This application is a continuation of PCT/RS94/00030, filed Mar. 22, 1994.

FIELD OF THE INVENTION

As is expressed in the title of this specification, the present invention refers to a didactic-educational toy for elementary arithmetic operations, reading and writing, which provides a series of relevant and advantageous features with regard to the presently existing devices for these activities. The child's imagination is also exercised due to the fact that the pieces can be connected as a construction, obtaining three-dimensional geometric shapes as there are varied connection and joining pieces.

The different elements that identify the digits have some corresponding protuberances that make the represented number identifiable by touch.

Upon handling the different elements that comprise the toy, mental calculation and the interest to learn how to read and write are enhanced to a larger degree than with other means and devices presently on the market.

Upon carrying out operations and forming the tens, the same are more easily identifiable. There are also figurative pieces that allow one to study the spatial concepts of left, right, up, etc., stimulating the child's oral expression as problematic situations arise, making the didactic toy more attractive.

All the components parts are easily interconnected, which allows the base surface to be increased in order to carry out operations, as well as to form words and sentences.

BACKGROUND OF THE INVENTION

There are presently means or tools to carry out this type of operations, consisting of prismatic slide rules of different lengths and colors, abacuses and other types of boxes containing cubes, slide rules and boards.

With these elements, upon being very repetitive, carrying out elementary operations becomes tremendously difficult, and on the other hand the basic digits are not identifiable by touch. Figurative pieces that can be assembled to study the spatial concepts of left, right, etc. and to stimulate oral expression, as well as graphic expression, mathematical as well as to start the learning of reading and writing, are not known either.

In general lines, in order to achieve the above cited advantageous characteristics, as well as to eliminate the inconveniences cited in the prior art, the didactic-educational toy for elementary arithmetic operations, reading and writing, that constitutes the object of the invention, is comprised of a series of parts or elements that we can distribute in two big groups: one of them that comprises all the parts that allow elementary aritmetic operations to be done, and the other that includes another part and letter cards to form words and sentences.

The following elements belong to this first group:

a) Ten rectangular plates from whose top surface ten dowels distributed in two rows of five emerge, these being the base pieces upon which other plates representative of digits will be inserted, as we will see hereinafter. In the base of each dowel there is a fine cylindrical widening to facilitate the lifting of the first inserted plate.

These plates with dowels have a peripheral furrow or groove, made in the edges, thus the coplanar connection of these plates can be carried out, with the help of some boards of lengths corresponding to the sides, inserted in said grooves.

Each rectangular plate is green on the top surface and white on the bottom surface, representing the tenth part of a hundred's place that would be formed upon assembly ten plates, identifying the hundred's place. As we will see later on, the color red will be used to mark the ten's place, and blue to define the one's place.

b) Elongate boards, colored red that, as we have indicated above, serve to join two green rectangular plates, remaining perfectly assembled and the red color thereof meaning the fact that a ten has already been surpassed, as we will see later on. Besides, these boards can replace other elements that mark the ten's place, carrying out an abstraction and simplification process. Therefore, one of the elongate boards can be placed longitudinally between the dowels of the plates, visualizing ten of them when the ten plates are assembled with dowels.

c) A series of thinner plates representative of digits (from 1 to 10). The surface of the plate corresponding to number 10 coincides with the plate with dowels, the one of number 1 being the tenth part of the total surface. The surface of number 2 is equivalent to two-tenth parts, and so on, forming the different numbers from two parallel pair alignments, representative of the preceding even number.

Each one of these thin plates has some stepped cylindrical protuberances, provided with a through hole located in the center point thereof and whose diameter is equivalent to that of the dowels of the base plates to facilitate the stacking thereof upon breaking sown a number. There is a blue colored perimetric strip, with the exception of the plate that defines number 10 which is red as it corresponds to a ten.

Besides they have some hollow spaces with specific shapes in their contour in order to make the identification of the number of cylindrical protuberances easier, or the counting thereof by groups.

In order to facilitate the lifting or release of the plates with dowels due to their slight thickness, it has been provided for that they can include some points thickened on the bottom surface thereof, in replacement of the cylindrical widenings of the base of the dowels.

When these thinner plates, representative of digits, are inserted in the rectangular plates with dowels, the ends of the latter project in order to allow the identification thereof by touch.

d) Transparent templates, of an identical surface as that which corresponds to the number 10, with a red perimetric strip on the edge and ten circular orifices that allow tight insertion in the cylindrical protuberances of the digital plates, the latter already inserted in the plates with dowels, thus the tens that are being formed upon operating can be visualized.

e) A rectangular mold with housings in which the digital plates themselves fit, with identification of the shape by the student, there being some lateral recesses to facilitate the lifting of the inserted plates. In the top part of each housing there is a circle drawn containing the furrow of the shape and the mnemonic drawing thereof that thus helps one to remember the figure. In this way one manages to identify the number with its shape and to write it, operating as a digital plate. This furrow defines a path to be followed by a pencil or scriber, starting from an initial point preferably distinguished in red, thus the automatization and correct tracing of the shape are facilitated.

f) There is also a series of figurative parts that, assembled in the edges of the rectangular plates with dowels, allow the study of spatial concepts of left, right, up, etc. stimulating oral expression as problematic situations arise and making the toy more attractive.

g) Assembly parts of the different digital plates that are incorporated in the stepped stubs. They are "X" shaped or double "X"-shaped with small inside protuberances in the ends of their arched branches, these protuberances inserting in respective recesses existing diametrically opposite in the widest part of the stepped cylindrical protuberances.

h) Pincers for fastening the figurative plates and other elements that we will see hereinafter, related to the second group of cards and elements for reading and writing. One of the limbs of these fastening pincers, has a cylindrical stub that can be inserted in one of the cylindrical recesses of the bottom face of the digital plates, these pincers being rigid or articulated in order to change the plane.

i) Small rectangular plates with two orifices or two pairs of them and the mathematical sign "plus" drawn thereon, in which the portions with the largest diameter of the stepped cylindrical protuberances of the digital plates are inserted, allowing one to add them up and these little plates act as assembly elements and they are to be used in the event that the small children who play with the toy cannot use the "x"-shaped assembly parts due to the risk involved in their small size.

j) Articulating parts that include an articulating head that allows movement like a hinge, turning 90° on both sides in order to change the plane and to form different angular positions with the different component parts of the toy. The maximum rotation limit positions, as well as the coplanar one and the other intermediate positions are stable. These articulating parts have in one of the faces irrespective of the geometric shape thereof, one or several annular bulges that are susceptible to fitting in the corresponding annular channel of the bottom face of the digital plates, provided for this purpose. It also has some flexible end tongue pieces that facilitate disassembly. These articulating heads can also be inserted in the tongue pieces that are inserted in the perimetric groove of the plates with dowels or in the one also existing in other digital plates that have a thickness equivalent to that of the plates with dowels.

k) Plates with stepped cylindrical protuberances and a thickness equivalent to that of the plates with dowels representing the different digits and just like the latter they include the perimetric groove on the edge, also including some recesses or slits that define a castellated contour, joining together the different plates with grooved and tongued coupling tongue pieces.

l) Decorative pieces that have protuberances to fit in the castellated recessed of the plate, aside from partially inserting in the perimetric groove. One of these decorative pieces has a triangular or rectangular shape and represents half the unit which is also usable in architure upon building houses, dolls, etc.

As we had indicated before, the didactic educational toy included other parts or elements that make up what we have called the second group of cards, apt for learning how to read and write. They are basically the following:

a) Cards apt for learning how to read and write, having a different contour and color for the consonants and for vowels. The consonants may be printed on rectangular cards and the vowels or circular cards, for example.

b) Molds or plates provided with housing to place the vowels and consonants individually. Hence, marking the rectangular or circular contour of the letters is made possible in order to later trace or delineate the shape thereof.

c) Cards with allegorical drawings of the words that are printed on one of the surfaces thereof, while on the reverse side of the same there is only the rectangular or circular mark of consonants and vowels, respectively, therefore not including the written word. This may be used so that two contestants, discovering words or sentences previously positioned on a board, play.

One or more plates with stepped cylindrical protuberances and that have a castellated contour can be used as a board. In each one of the slots a card fit in just like the decorative figures can be placed, these cards having a tongue piece and a groove in opposite positions, for the grooved and tongued coupling thereof and to thus permit the forming of words that can be separated by other blank cards or that contain a period.

The cards that include the allegorical drawings of the words appearing on them, are fastened to the plates by means of pincers, one of whose limbs is inserted in the perimetric groove, which may be provided with small reliefs to optimize anchoring.

To provide a better understanding of the features of the invention and forming an integral part of this specification, some sheets of drawings in whose figures the following has been represented in an illustrative and non-restrictive manner, are attached hereto.

DESCRIPTION OF THE PREFERRED EMBODIMENT

Figure 1:
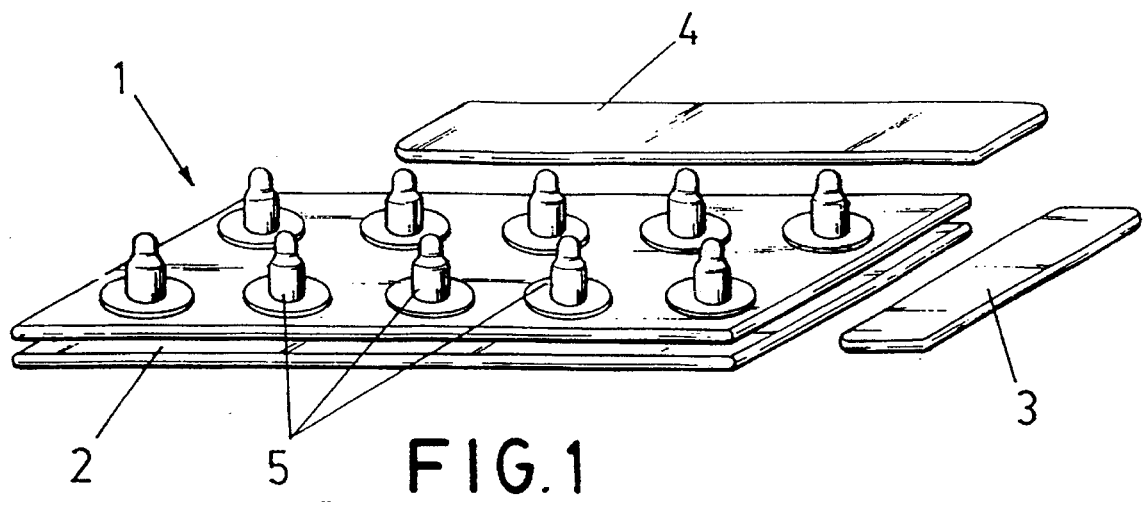
FIG. 1 is a perspective view of one of the rectangular plates provided with dowels to allow the connection of the plates corresponding to the digits, showing in a perspective exploded view the boards for coplanar connect ion of several plates.
Figure 2:
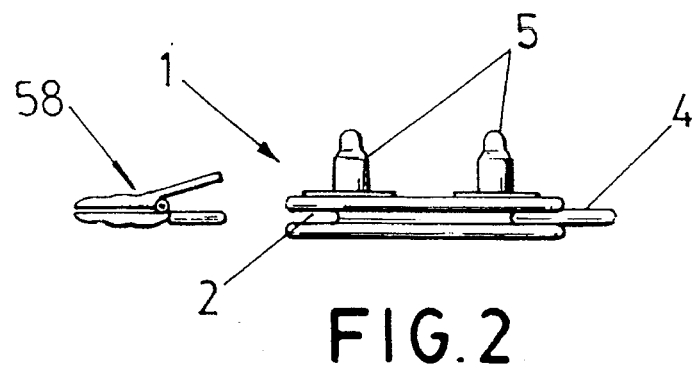
FIG. 2 is a raised side view of FIG. 1, also showing a fastening pincer of the figurative pieces, in an exploded view.

Making reference to the numbering used in the figures we can see how the didactic-educational toy for elementary arithmetic operations, reading and writing, that the invention proposes, includes a series of elements or parts that can be assembled together, being basically the following ones:

In the first place, there are ten rectangular plates generally referred to with number (1) and whose configuration can be seen in FIGS. 1 and 2. They are considerably thick given that in the edges thereof the peripheric groove (2) is made for partial insertion of the rectangular boards (3) and (4), used for coplanar connection between juxtaposed plates (1).

Each one of these rectangular plates (1) has ten perpendicular dowels (5) whose top end is recessed in order to facilitate insertion of other parts comprising the toy, specifically those shown in FIGS. 3 to 9.

Figure 3:
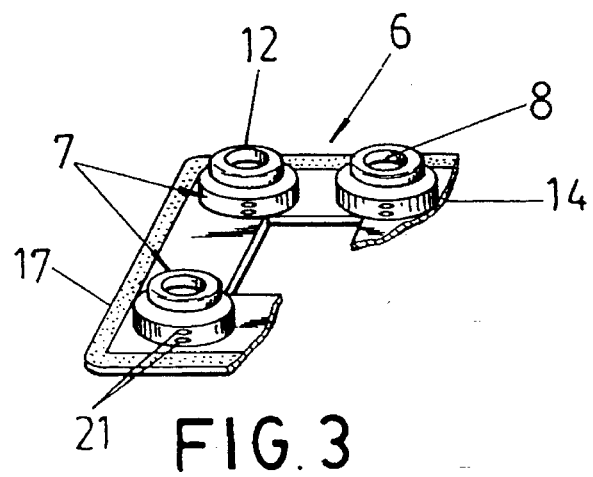
FIG. 3 is a partial perspective view of the digital plates.
Figure 4:
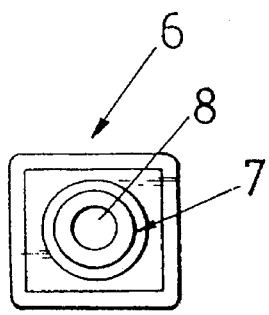
FIGS. 4, 5 and 6 are respective plan views of some of the digital plates of FIG. 3 and representative of some of them.
Figure 5:
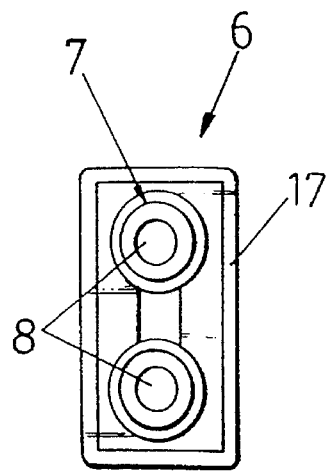
Figure 6:
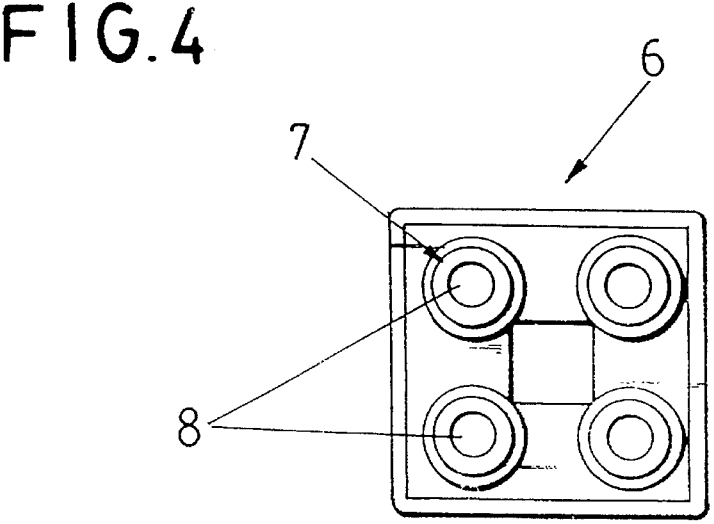
Figure 7:
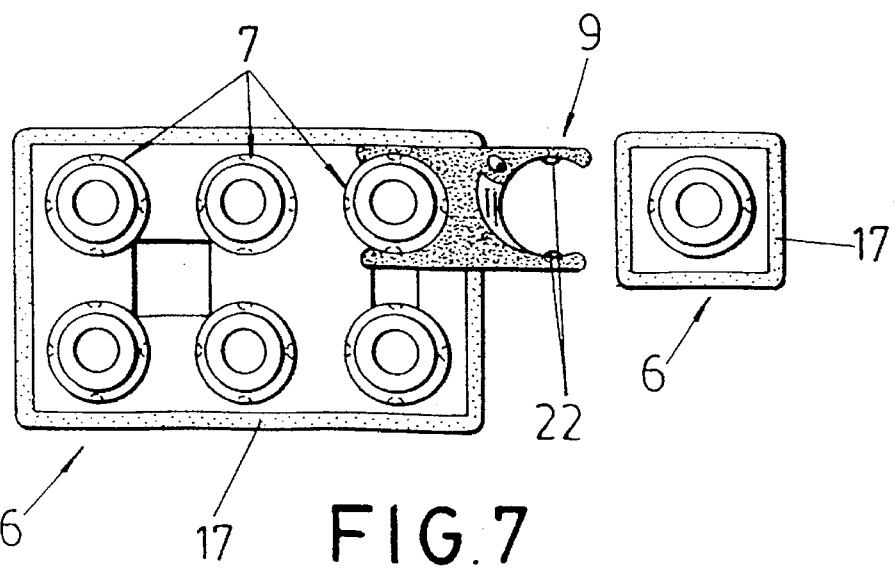
FIG. 7 is a partially exploded plan view, in which the formation of the numbered "seven" is observed by means of the connection of the digital plate "six" and the digital plate "one", by means of the "X"-shaped assembly part.

In FIGS. 3 to 9 we can see the thinner plates represented that define some of the digits and that are superimposed and that fit in the dowels (5) of the rectangular plates (1). In FIG. 3 we can see a perspective partial view of one of these thinner plates, generally referred to as number (6) and that has short stepped cylindrical protuberances (7) in the top face thereof, according to a distribution in accordance with the number that they represent, having a through hole (8) with a diameter adapted to that of the widenened portion of the dowels (5) of the rectangular plates (1) that are used as a base for formation and juxtaposition of plates (6), facilitating the fitting together upon the stepping being of the truncated cone-shaped type. Hence, in FIGS. 4 to 6 plates (6) that correspond to the digits one, two and four are shown, having a total surface proportional to the number that they represent. FIG. 7 shows the formation of the number "seven" simply by adding the number "one" to the number "six" with the help of the assembly part (9).

Figure 8:
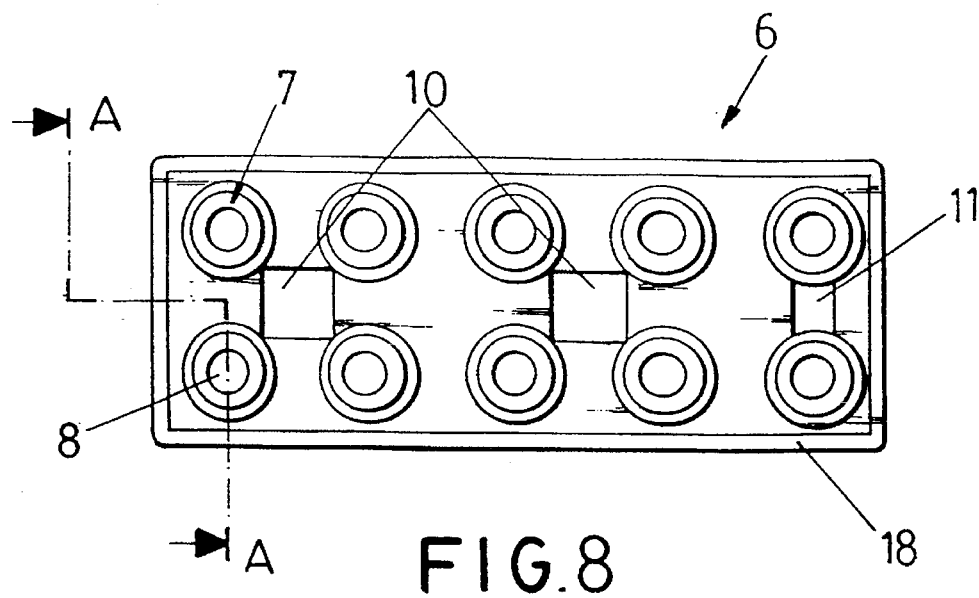
FIG. 8 is a plan view of the digit "ten."

In FIG. 8 we can see a plate with cylindrical protuberances (7) that correspond to a ten. In order to facilitate the counting of the number of stepped cylindrical protuberances (7) that these plates have, every four protuberances (7) that exist according to the vertexes of a square, are grouped by an intermediate hollow space (10). The cylindrical protuberances (7) are distributed in two rows of five. The last pair is related by a generally rectangular shaped recess or hollow space (11).

Figure 9:
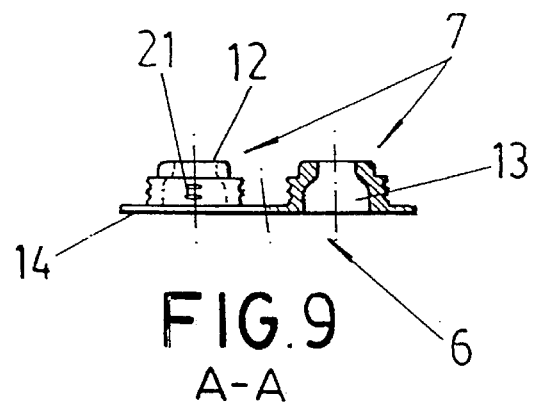
FIG. 9 is a section along the A—A cut line of FIG. 10.

In FIG. 9 we can see the cross section of the plates (6) where the stepped cylindrical protuberances (7) have a step that determines the formation of an end portion (12) with a smaller diameter, tight fit in the cylindrical recess (13) existing in the bottom face of the plate (14), thus allowing the stacking of this type of digital plates (6).

Figure 10:
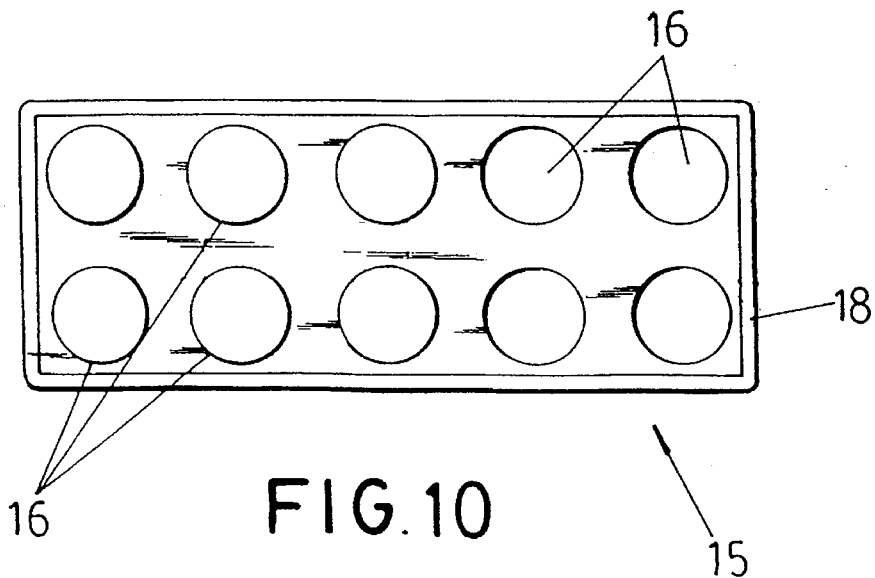
FIG. 10 is a plan view of one of the transparent templates.

In FIG. 10 a transparent template (15) that has ten circular orifices (16) has been shown.

As we have indicated at the beginning of this specification, the different elements comprising the didactic-educational toy for elementary arithmetic operations, have different colors, or else, they have a perimetric strip of a different color. Some of them may also be made out of a transparent material or may have a different contour. Hence, the plates (1) with dowels (5) are green; the rectangular boards (3) and (4) to assemble different plates (1) are red; the perimetric strip of the transparent templates (15) is red and is referred to as number (18), just like the plate with dowels (6) that corresponds to the number "ten."

Figure 12:
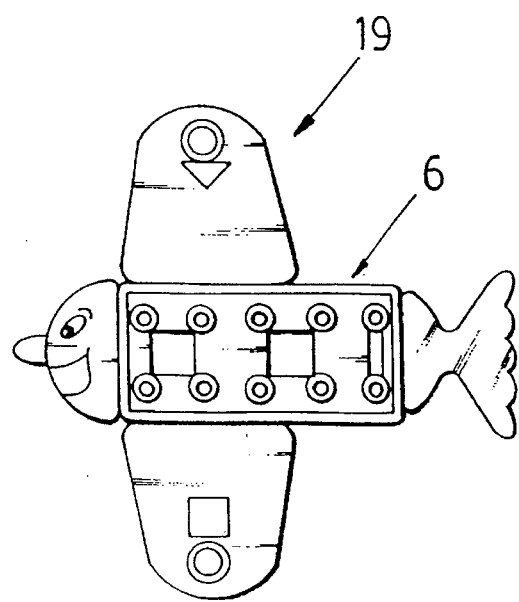
FIG. 12 is a plant view of a plate with dowels, or plates with stepped cylindrical protuberances, provided with figurative pieces that allow one to study the spatial concepts of left, right, up and down, simulating a toy airplane.

In FIG. 12 we can see the figurative pieces that can be assembled in the grooves (2) of the plates with dowels (1), just like the red rectangular boards (3) and (4) (see FIG. 1), with which drawings can be formed, in this case a toy airplane and as we have said before they allow the study of spatial concepts of left, right, up and down, as well as stimulating the child's oral expression upon problematic situations being posed. These figurative pieces are generally referred to as number (19).

Figure 13:
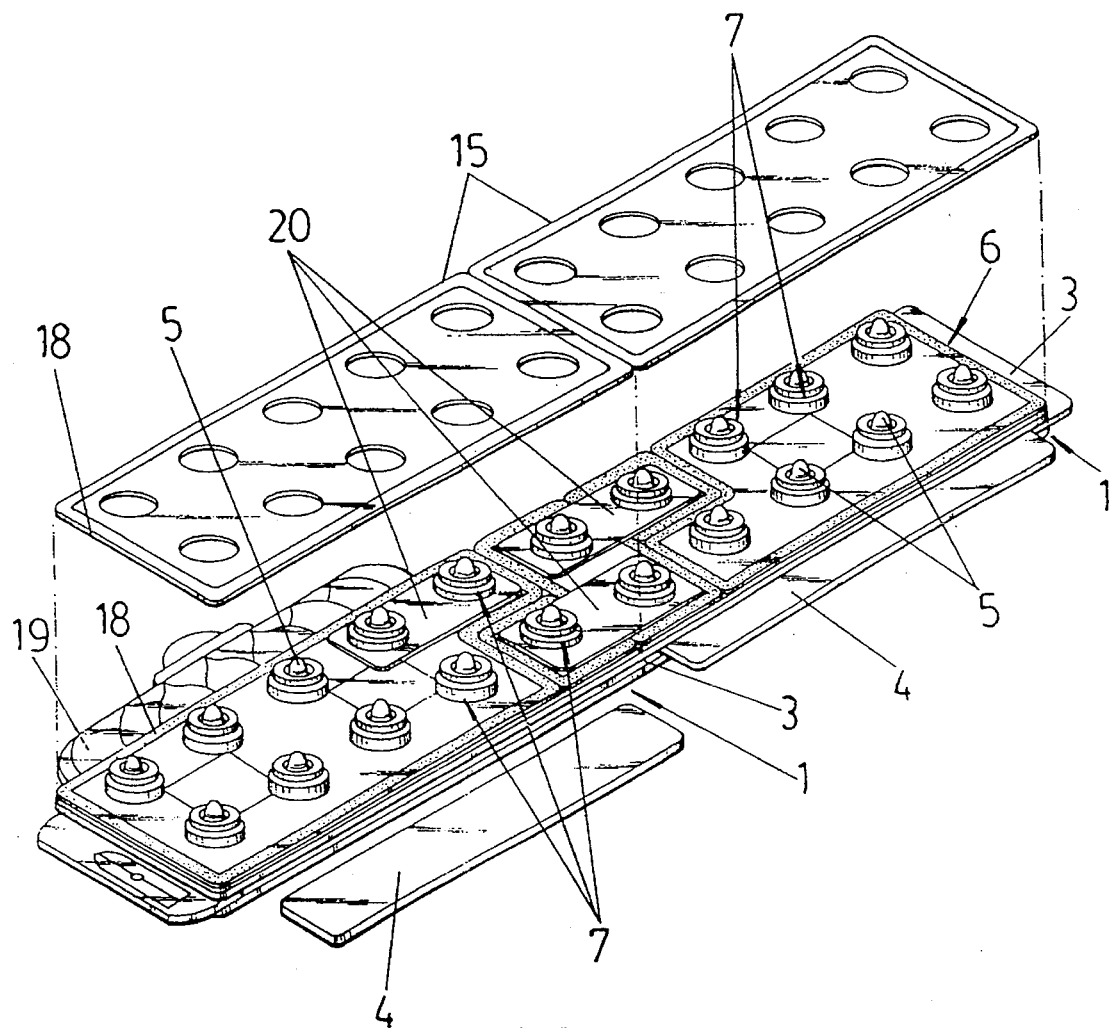
FIG. 13 is an exploded perspective view to observe the way in which a specific arithmetic operation is carried out.

FIG. 13 shows an operative example in which "nine", plus "four" plus "seven" have been added up. For this purpose the thin plate (6) with nine stepped cylindrical protuberances (7) has been used, inserting the different addends upon two plates with protuberances (1). The first addend is in turn obtained upon adding the one to the number "eight", by means of a small plate (20) which we will discuss later on in connection with FIG. 14. The addend "four" is previously obtained by joining to number "two" the representative number of the one on both sides, which is done with the help of other small retention plates. The different plates (6) have a blue perimetric strip and as two groups of ten have been completed, the transparent templates (15) that have a red perimetric strip (18) are inserted in them.

Referring to FIG. 7 once again, we can see that the assembly parts (9) join the blue stepped cylindrical protuberances (7) and they allow replacement of the special templates of even numbers to be joined with the uneven ones, replacing for example the center addend "four" of FIG. 13. The uneven number templates can also be replaced given that it suffices to add the number "one" to the preceding even number.

The digital plates (6) have a blue perimetric strip (17), as identification of the ones. Upon adding "six+one" (see FIG. 7), the assembly part (9) hides the perimetric strip (17) that corresponds to the connection area, thus offering only the perimetric strip of the number that identifies the sum.

In FIG. 3, as well as in FIG. 9, we can see the small elongate notches, distributed in pairs and diametrically opposite in two perpendicular diameters referred to as (21), to immobilize the assembly parts (9), provided for this purpose with small bulges (22).

The transparent templates (15) of FIG. 10, aside from being used to surround the tens that arise upon working, serve as operation bases (with the same function as the green plates with dowels (1)), the stepped cylindrical protuberances (7) of the digital plates (6) inserting in the circular orifices thereof (16). By means of a red board, whose dimensions can coincide with the rectangular board (4) for coplanar connection of different plates with dowels (1), the formation of tens can be identified, placing them in an inserted manner between the stepped cylindrical protuberances (7).

Figure 11:
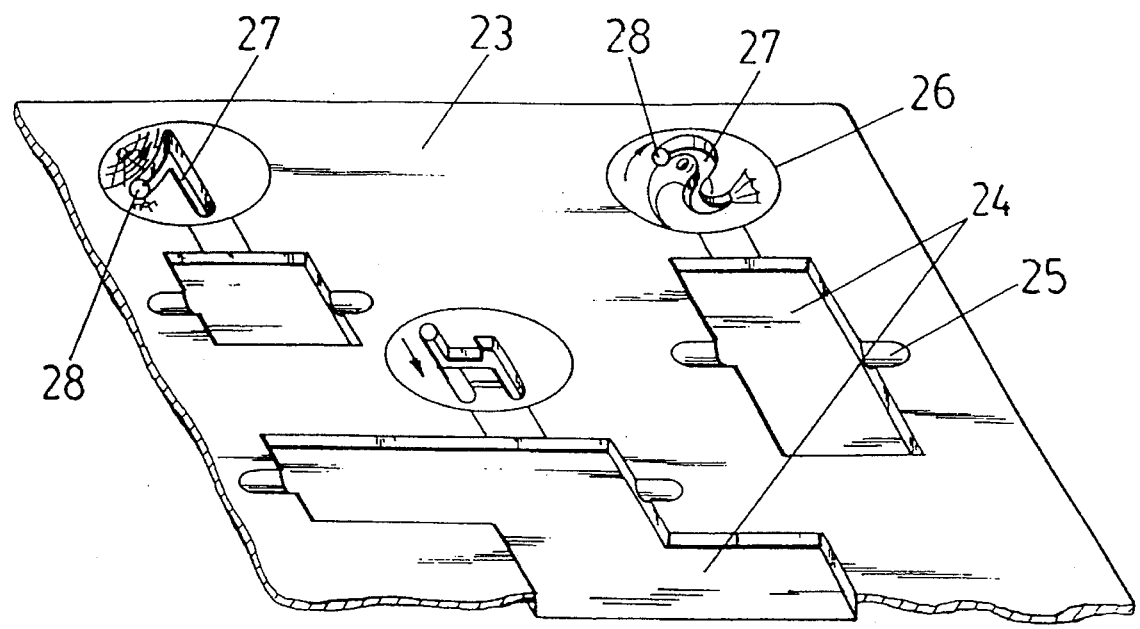
FIG. 11 is a perspective view of a plate with ciphers for identification of the digital plates and tracing of the corresponding shape in the groove of the cipher thereof.

Now making special reference to FIG. 11, we can see with reference number (23) the plate with ciphers that includes some recesses or slots (24) made on the surface thereof. The suitable template with stepped cylindrical protuberances (6) that correspond to the contour thereof would fit in them, to identify the extension of the number with its shape. There are hollows (25) on two sides of these recesses (24) to facilitate the lifting of the inserted plates (6). A circle (26) containing the groove (27) of the shape and the mnemonic drawing thereof is drawn on the top part. This groove (27) defines a path that will be followed by the pencil or scriber starting from an initial red point (28), facilitating automatization and correct tracing of the shape before writing it.

In a basic option, the types of parts that would be needed to be able to work would be:

—Plates (6) with numbers "one," "two," "four", "six", "eight" and "ten." The anchoring parts (9) allow manufacturing to be reduced to numbers "one," "two" and "four."

—Anchoring parts (9), which may also be double to simultaneously join the two rows of digital plates (6).

—Transparent templates (15).

—Red boards to join the plates with dowels (1) and to make the tens upon fastening them between the stepped cylindrical protuberances (7).

—Rectangular plates with ciphers (23).

—Rigid and articulated pincers.

To work with hundreds and in order to be able to represent this mathematical concept it has been provided for that the bottom face of the digit "ten" of the plates (6) or some transparent templates (15), have a perimetric green strip (colors that indicate the formation of the hundred). Several green colored elongate boards could be used for this purpose. Making the modifications of the first two parts, the logical acceptance thereof would be had given that upon the number "ten" nine other plates can be stacked and the hundred would be formed.

Figure 14:
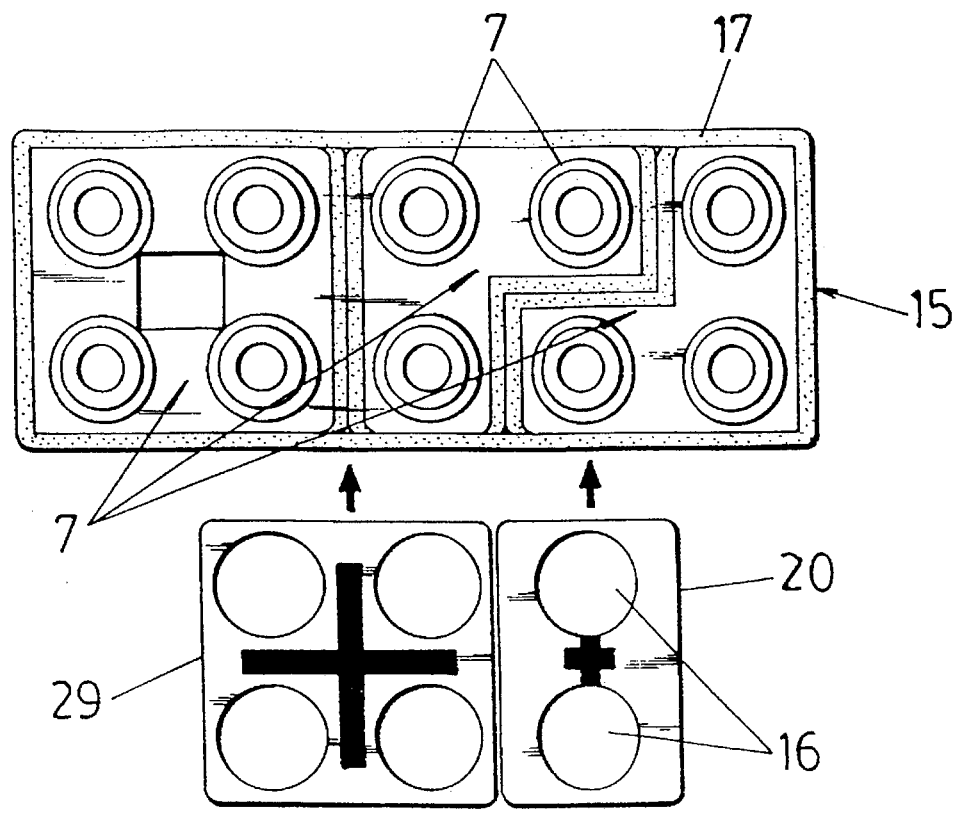
FIG. 14 is an exploded plan view in which an operation with three addends is shown, connecting together with the help of the anchoring parts provided with circular orifices for insertion in the stepped cylindrical protuberances of the former.

Now making special reference to FIG. 14 we can see with reference numbers (20) the rectangular small plates that can be used to replace the assembly parts (9), in the event that the latter might represent a danger for the small player, due to the small size thereof and due to the fact that they are open. These little plates (20) have circular orifices (16) for insertion in the stepped cylindrical protuberances (7). The dimensions of these rectangular small plates are such that they do not manage to cover the colored peripheral edge (17), in the connection area, in the event that these parts are white or opaque, although they may also be transparent in order to see the break-up of a number. Making reference to this FIG. 14, the operation "four+three", we can see that in a first option these digital plates (6) have been inserted in a transparent template (15) without the need to use the green plate with dowels (1). Using the rectangular small plates (20), or else, similar assembly plates (29) but with a double number of orifices (16), the transparent templates (15) can be omitted, operating in the following manner:

The first addend, plate "four", to which the little assembly plate (29) is coupled in its protuberances, is used, advancing in the direction indicated by the arrows, thus orifices (16) thus inserting in the stepped protuberances (7), the unit fitting in perfectly. Then, one proceeds in the same way with the rest of the addends, the blue fringe sections, contiguous to the two addends, remaining hidden. Finally, a transparent template (15) with a red perimetric strip, or a red board will be inserted to indicate that a group of ten has been formed.

These anchoring plates (20), opaque ones (29) are important because this presupposes the progressive visualization of partial sums, eliminating blue sections and above all because with few types of digital plates (6) the remaining digits can be formed, without the need to be manufactured, as is seen in FIG. 13.

Figure 15:
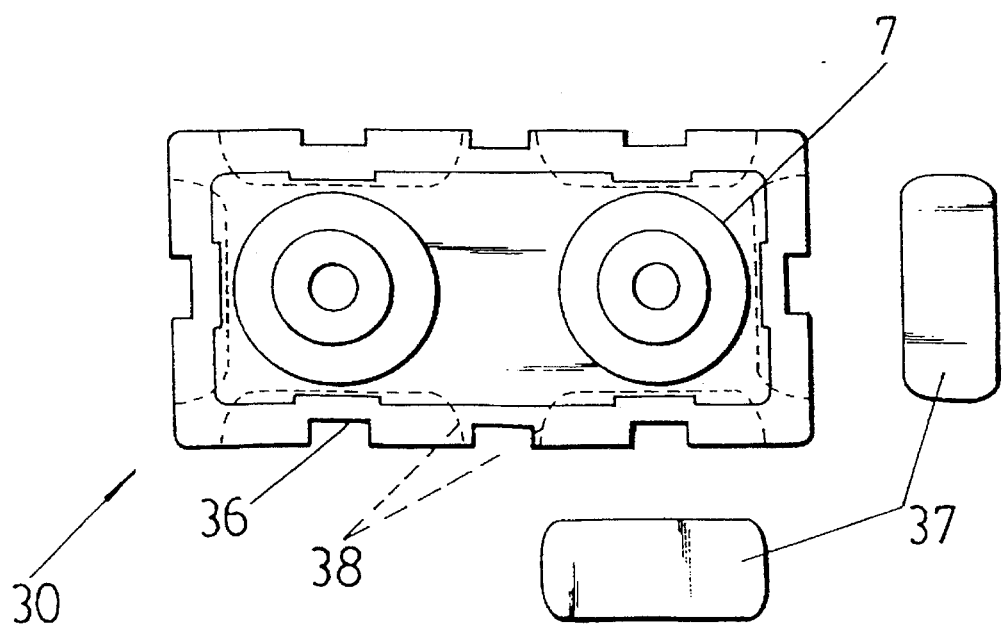
FIGS. 15, 16 and 17 are plan, raised and sectional views of a plate that identifies the number "two" and that includes the stepped cylindrical protuberances, as well as the perimetric groove in the edge.
Figure 16:
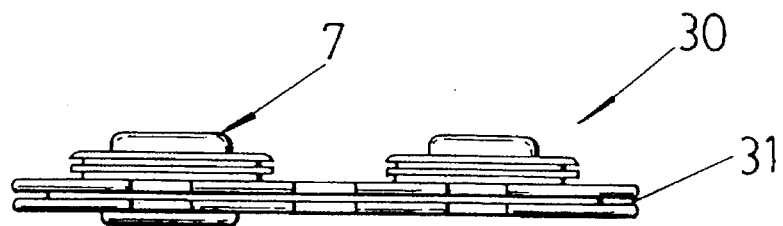
Figure 17:
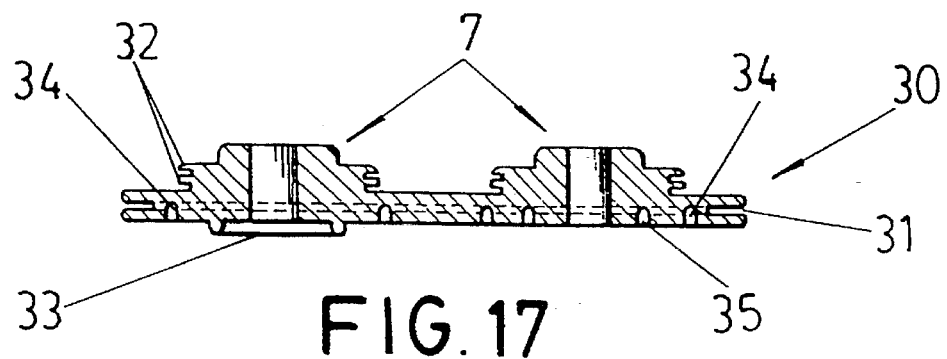
Figure 18:
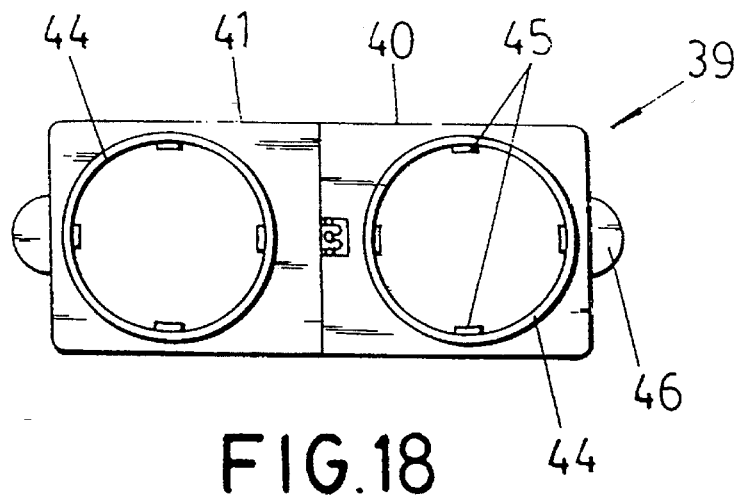
FIGS. 18 and 19 are respective plan and longitudinal raised views, of an articulating part.
Figure 19:
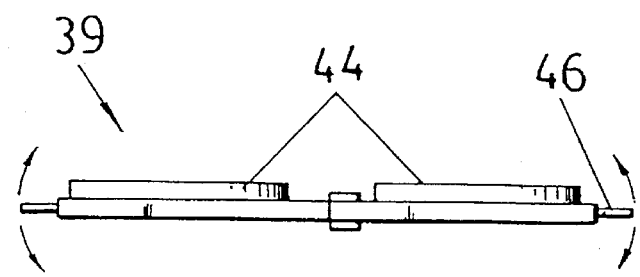
Figure 20:
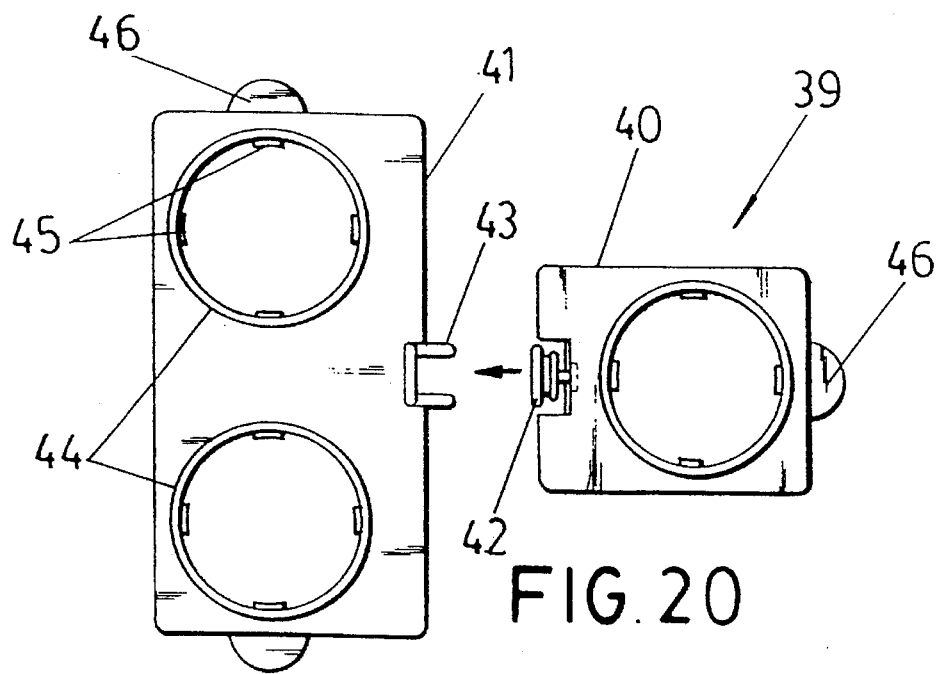
FIG. 20 is an exploded plan view of an articulating part with one of this components limbs larger than the other, showing the articulation head schematically.

In FIGS. 15 to 17, with reference number (30) there are the thicker digital plates, whose thickness coincides with that of the plates with dowels (1) and that also have a perimetric groove (31). The stepped cylindrical protuberances (7) can have an alternative construction, with some diametric cuts to make the fitting together more elastic, as well as two circular grooves (32) with points with a greater widening to collaborate in the fastening of the assembly parts (9) and articulating parts which we will discusss later on. A single transversal cut would also be made in the stepped cylindrical protuberances, but they must turn one in terms of the other and on the base of the plate.

In the reverse of these plates (30) there is a ring or annular embossment (33) and a concentric groove (34) (see FIG. 17). The plates (30) have in their end opposite the one where there is the annular embossment (33), another annular groove (35) concentric to and interior to the groove (34), thus allowing the assembly of two plates (30) by their reverse, upon the ring (33) and the annular groove (35) having the same diameter.

In FIG. 15 we can specifically see, a plate (30) with a perimetric groove, corresponding to the number "two." The small rectangular recesses symmetrically distributed along the contour thereof are referred to as number (36).

Reference (37) of FIG. 15 designates the independent tongue pieces that are used for the juxtaposition of plates (30), the latter having recesses (38) of the same geometric shape as the tongue pieces in order to immobilize them.

The annular groove (34) concentric to the cylindrical protuberances (7) of the bottom face of the digital plates (30) is used for the coupling of the articulating parts that allow the plane to be changed and allow geometric shapes in space to be formed, for use thereof in constructions. We can see these articulating parts mainly in FIGS. 18 to 21 and they are generally referred to as number (39). They include two complementary parts interconnected as a hinge, referred to as (40) and (41), coupling by means of the articulating heads formed by two components integral to the respective element, referred to as (42) and (43). The articulating parts (39) have rings (44) in each one of their limbs or parts, materializing the means of connection to the digital plates (30), upon tightly fitting in the annular groove (35) of the reverse of the same and the articulating heads fitting in the peripheral recesses (36). As it can be inferred from observing FIG. 17, the diameter of the annular form of the groove (34), coinciding in turn with that of the rings (44) of the articulating parts (39) is identical to that of the larger dimension of the stepped cylindrical protuberances (7), which permits tight insertion, assisted by the existence of the small diametrically opposite protuberances (45), that fit in the circular recesses or grooves (32) of said cylindrical protuberances (7) (see FIG. 17).

The articulating parts (39) also include some flexible tongue pieces (46) that faciliate disassembly, since the protuberances or bulges (45) sufficiently adjust pieces (40) and (41) in the circular grooves (32) of the stepped cylindrical protuberances (7).

Figure 21:
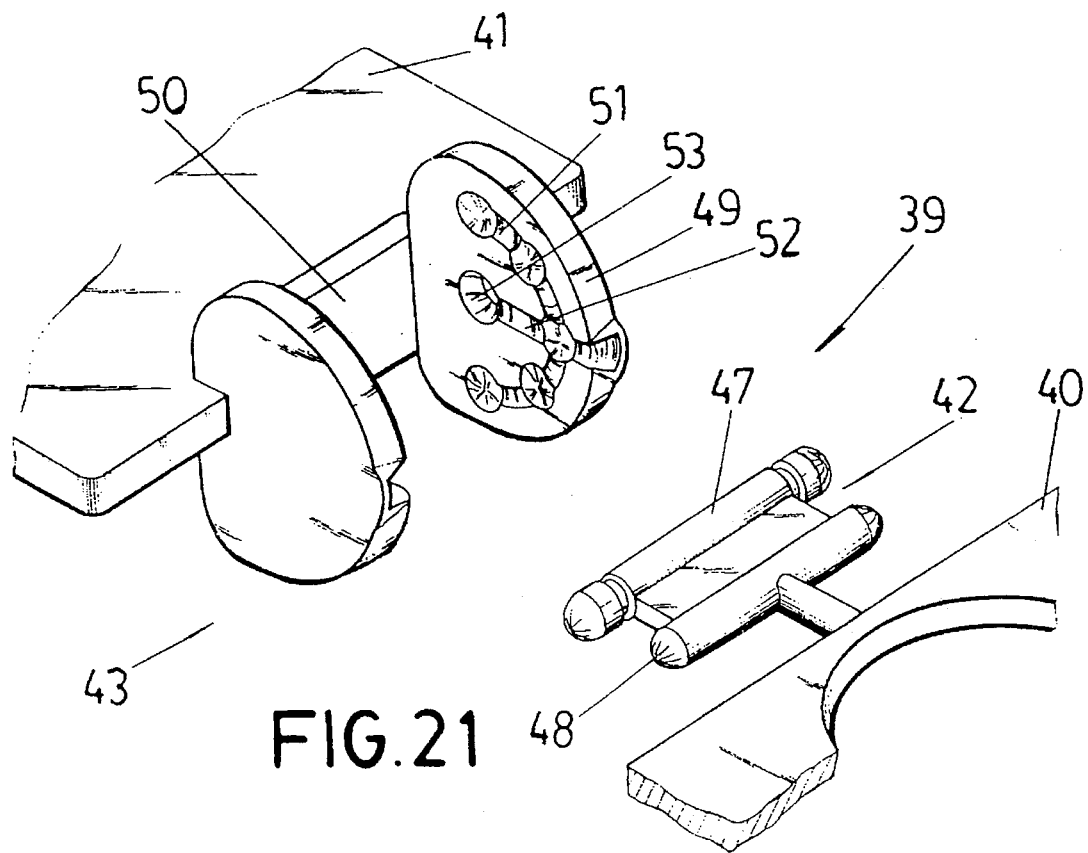
FIG. 21 is an exploded perspective view to show the structure of the articulating head of FIG. 20 at a larger scale.

Making special reference to FIG. 21 we can see in it and on a larger scale, the geometric shape that the components (42) and (43) of the articulated head of the articulation pieces (39) have. Component (42) acts as the male element and has two cylindrical portions (47) and (48) with different lengths. On its part, component (43) has two partition walls (49) with a general semi-circular contour and that emerge perpendicularly from a rear wall (50), in turn perpendicular to the plane of the wall or sheet (41) of the part of the articulating head in which it is found.

There are some arched paths (51) and other straight ones (52) on the inside surface of the walls or partition walls (49) and these straight walls open to the outside. The cylindrical portions (47) and (48) of the joint component (42) are introduced along the straight path (52), until the ends of the cylindrical portion (47) are introduced into the respective housings (53) that limit the straight path (52), in such a way that the cylindrical portions (48) remained aligned up with the arched path (51), which allows rotation 90° in either direction, there being intermediate positions at 45°, all of them marked by convenient widenings of the arched path (51), as it is simply inferred from observing FIG. 21 which we are now referring to.

Figure 22:
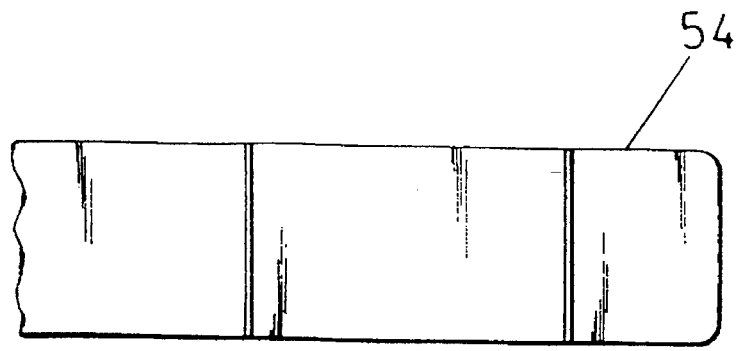
FIGS. 22 and 23 are respective partial plan and raised views, of a red board with a recess in one of its faces to mark the positioning of the plates of number "one."
Figure 23:
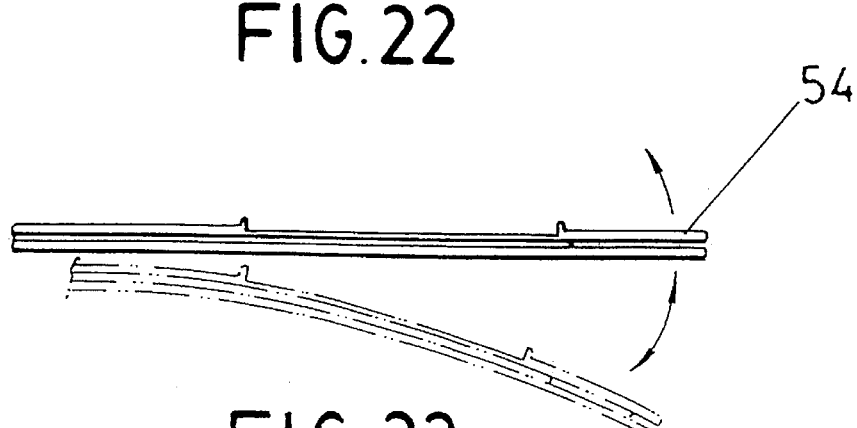
Figure 29:
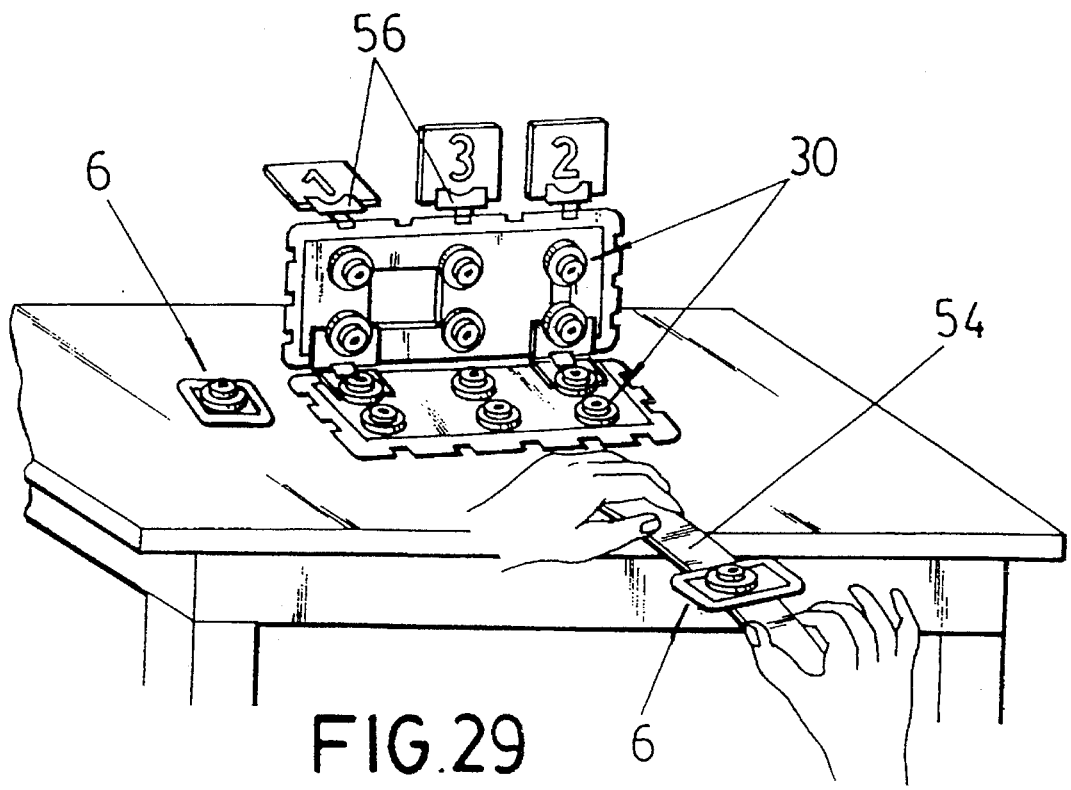
FIG. 29 is a schematic perspective view in which a practical use of the toy is shown, using the boards of FIGS. 22 and 23 as a catapult of the digital plates correspond to "one", to knock down the blank ones that are fastened by means of pincers to a dihedral shape obtained with thick plates.

One of the red boards that allowed the formation of a group of ten to be marked, upon remaining fit tight between the stepped cylindrical protuberances (7), referred to as number (54), can be seen partially in FIGS. 22 and 23. As a special characteristic it has the fact of including a perimetric groove and a recess in one of the faces thereof to serve as location and slightly fastening the little plate (6) corresponding to number "one." Its flexibility allows this card to capitulate upon exercising an extreme action just as it is inferred from observing this figure (23). This characteristic applied to a game of knocking down some vertical targets that occupy a raised position is also seen in FIG. 29.

Figure 24:
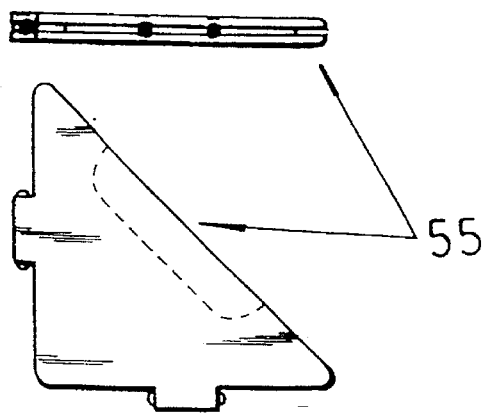
FIG. 24 shows a raised view of the plate that represents half of the unit and it is usable in architecture.
Figure 25:
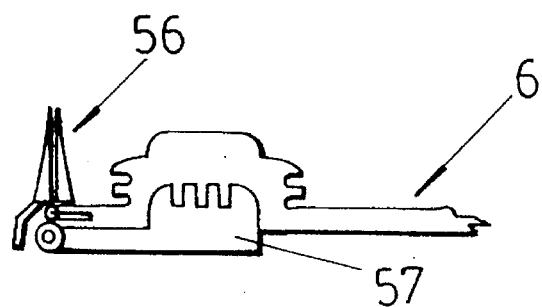
FIG. 25 is a schematic raised view of an articulated pincer, coupled to the reverse of one of the digital plates, the latter shown partially.
Figure 26:
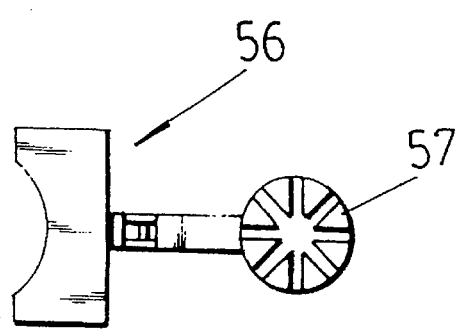
FIG. 26 is a plan view of the same pincer of FIG. 25 in a collapsed position.

As we said at the beginning, the parts representative of half of the unit, whose geometric shape is shown in FIG. 24 and which corresponds to an isosceles right-angled triangle, referred to as (55) are taken advantage of in constructions. In FIGS. 25 and 26 we can see how the coupling of some pincers (56) to the digital plates (6) is done, upon having a cylindrical stub (57) that can be inserted in the bottom cylindrical opening of the thin digital plates (6). The pincers (56) have as a special characteristic with relation to the rigid pincers (58) of FIG. 2, the fact that they are articulated to allow the plane to be changed, just as it is seen more clearly in the example shown in FIG. 29.

Figure 27:
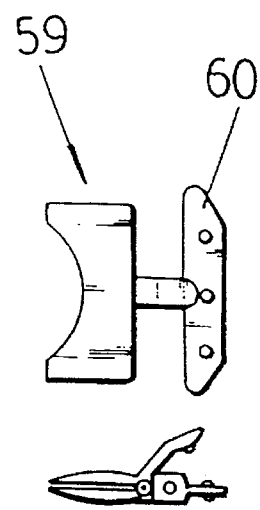
FIG. 27 is a plan raised view of another type of pincer to be fastened in the perimetric groove of the thick digital plates, or else, in the plates with dowels of FIG. 1.

In FIG. 27 we see another configuration of pincers, generally referred to as number 59, being fastened to the plates with a perimetric groove on the edge thereof, upon having a sheet-like extension (60) provided with small bulges for pressure insertion inside the perimetric groove of the plates (30).

Figure 28:
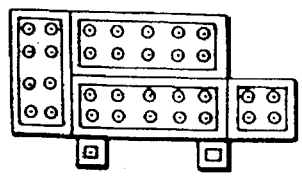
FIG. 28 is a composition of digital plates, arranged in such a way that a truck can be built with the addends.

In FIG. 28 we see an embodiment that can be encouraging for a child, if he is awarded something upon being able to make the figure of a truck will all of the addends.

In FIG. 39 the knock-down toy that we have commented on before in connection with the use of the flexible red boards (54) is represented.

Figure 30:
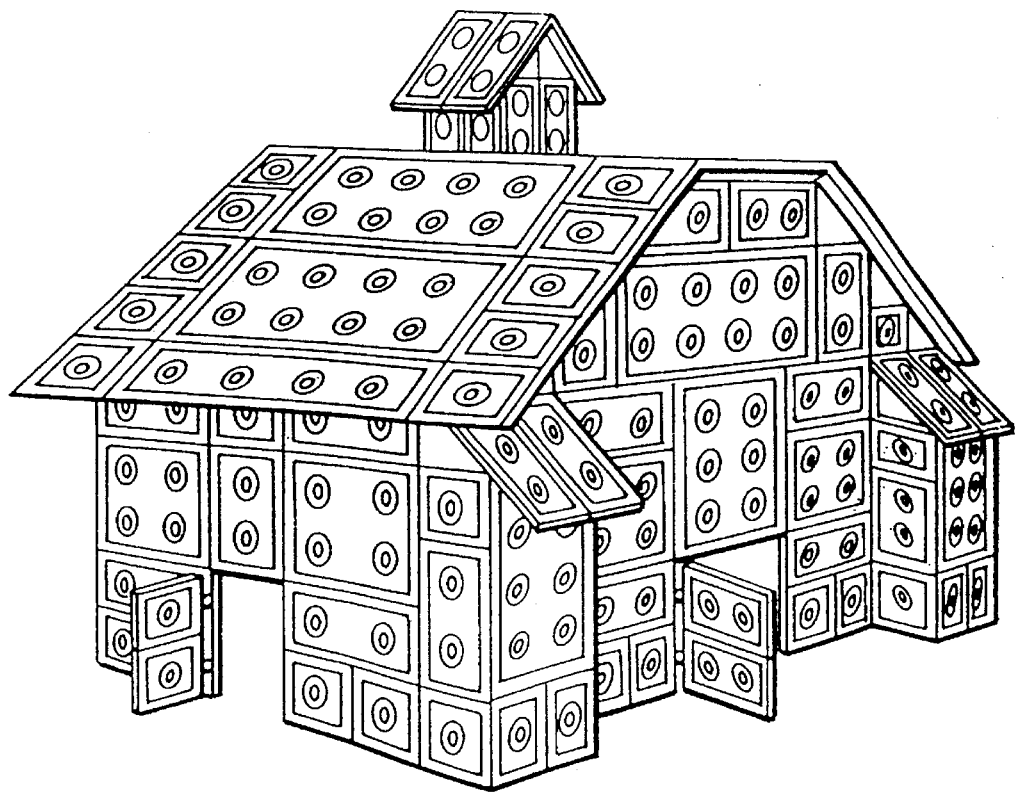
FIGS. 30 and 31 show examples of construction in space, with different plates and elements of the toy and with the help of pincers and other assembly parts.
Figure 31:
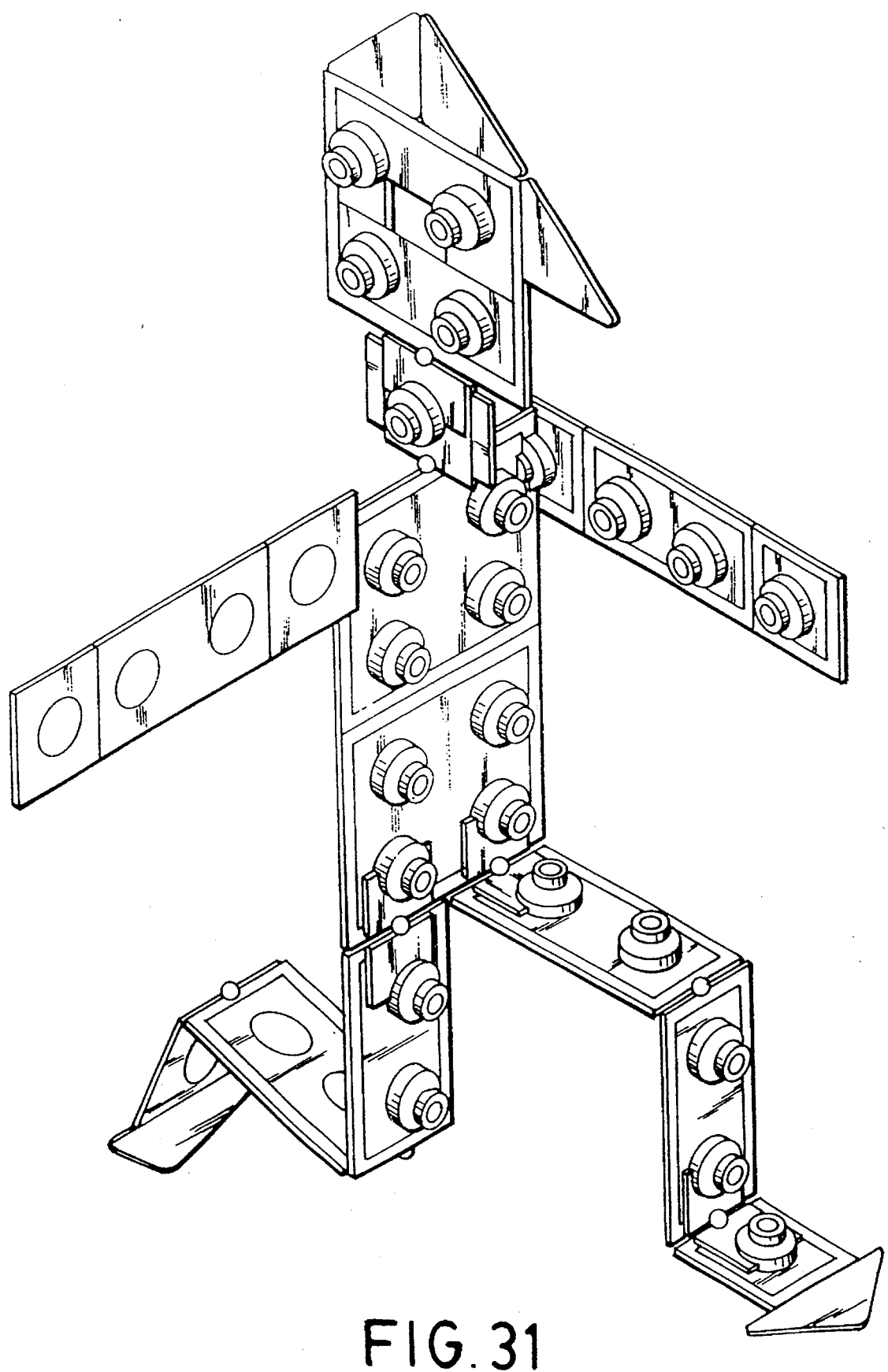

Other geometric bodies and figures that can be obtained with this type of toy are shown in FIGS. 30 and 31.

Figure 32:
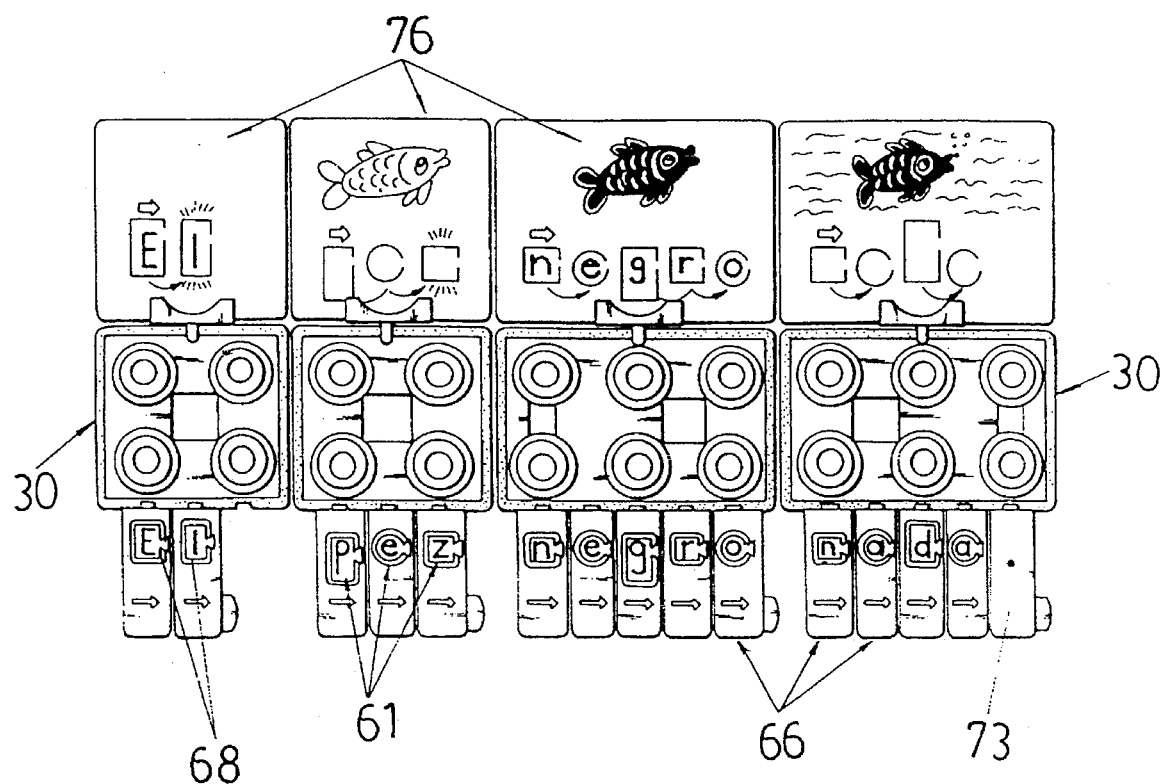
FIG. 32 shows a use of the invention to learn how to read and write, upon including figurative pieces with words and allegorical pictures of the same, as well as molds and letter cards.
Figure 33:
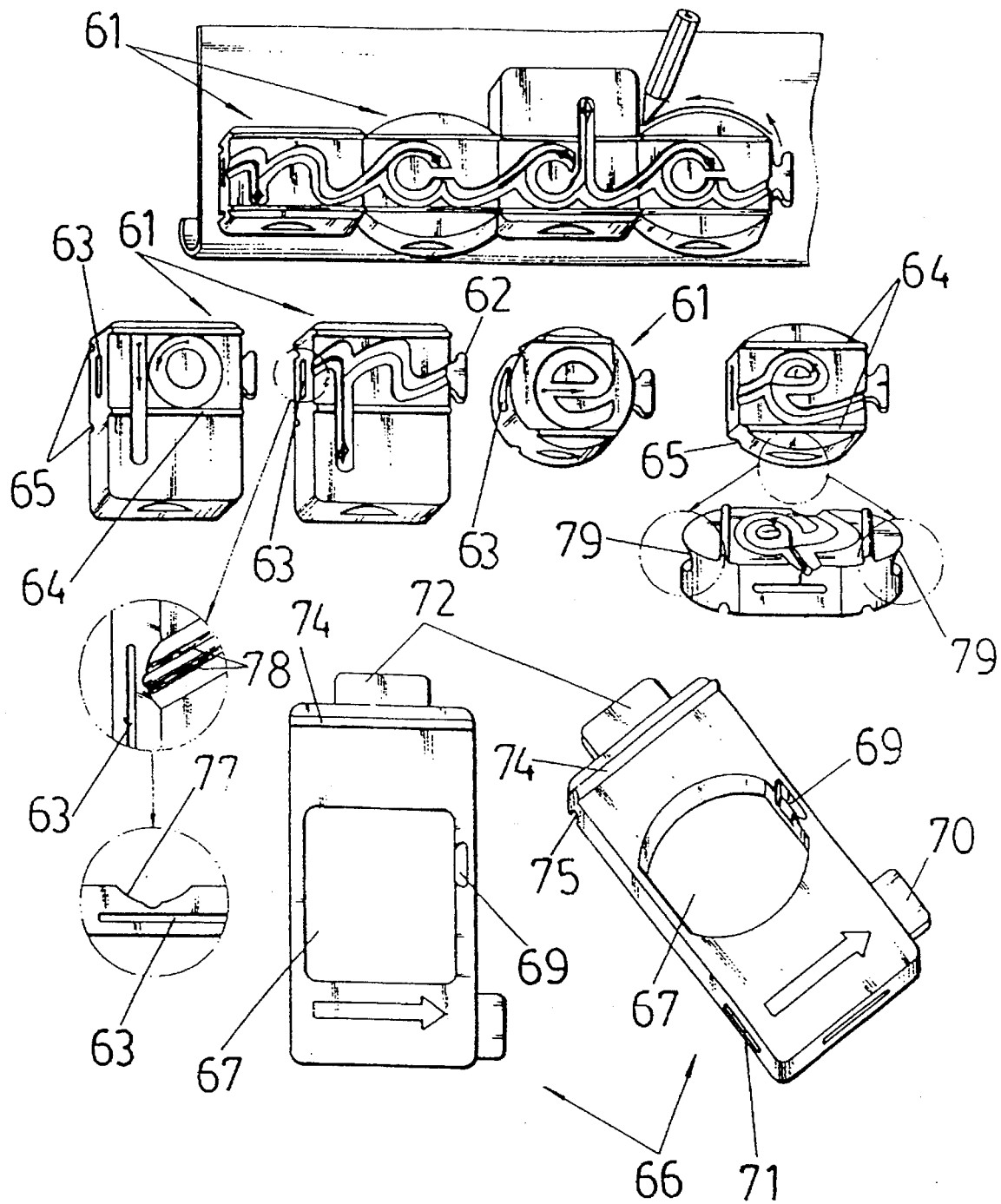
FIG. 33 shows different elements for writing, definded by letters card that can be connected together and molds.

Finally, in connection with FIGS. 32 and 33 we can see the use of the invention for learning how to read and write, for which we had indicated that there were parts comprising a second group of cards. There are cards (61) of a different contour and color for consonants and vowels, all of them having on one of their side faces a dovetail-shaped tongue piece (62) and on the opposite face a groove (63), these elements that define the grooved-tongued interconnection means for forming words just as it is shown in the top part of this FIG. 33.

The letter cards (61) also have on the top or viewed face a pair of horizontal protuberances (64) in correspondence with the horizontal grooves (65) of the bottom face, thus allowing the centered stacking.

The letter cards (61) can be linked together directly to form words, or else, each one of them can be put inside the molds (66) with a rectangular contour identical in all of them, though there are window-type recesses (67) inside them where the letter cards (61) can be placed. These recesses (67) correspond with the geometric shape that said letters have depending on the type of lettering, as in seen in this FIG. 33. The recesses or windows (67) have a contour oversized with regard to the letter cards (61), thus allowing the contour thereof to be marked upon passing the tip of a pencil through the path formed, just as it is shown with number (68) in FIG. 32. The tongue piece (62) that the letter cards (61) have is housed in the dihedral recess (69) of the mold (66), these elements (62) and (69) having a dovetail contour to keep the correct position of the letter cards (61) with regard to the window (67) immobile. The molds (66) have some side wings (70) and grooves (71) facing each other, for coplanar coupling thereof just as it has been indicated for the letter cards (61). These molds (66) also have other wings (72) placed in the top part for connection of the mold to the digital plates (30), upon being introduced in a tight manner in the perimetric groove of the same, as shown in the bottom part of FIG. 32. Thus, words that can be separated by hollow spaces, or else, by means of a blank mold or with a graphic point as referred to as (73) in FIG. 32.

On the top face of the molds (66) and close to the top wing (72), there is a horizontal protuberance (74) facing another groove (75) made in the bottom face, thus allowing stacking.

On the top edge of the alignment of digital plates (30) with a perimetric groove, just as is indicated in FIG. 32, there are other cards (76) that have on both faces the contour of the letters that make up the words that in turn correspond with the allegorical drawing that appears on the top part of the card. On the opposite or reverse face, there is also the same allegorical drawing and the entire word written. In FIG. 32 the cards (72) that occupy the first and third space have the word written, corresponding to the obverse side of the card, while those that occupy the second and fourth space offer the reverse side because they only show the contour of the types of letter (vowel or consonant), of the word. The cards (76) are fastened with the help of pincers and any of the types commented on above may be used.

In FIG. 33 the details corresponding to the bass-relief that defines the shape of each one of the letters of the cards (61) have been shown in a larger scale, with a deeper hollow in the bottom of channel (73) so that the student achieves a perfect tracing of the letter and can then produce it on paper, once the rectangular or circular contour of the different letters of the words that make up of the sentence has been drawn, just as it is shown in FIG. 32. The tracing direction in italics is determined and symbolized by: colored strips (78), with a thinner intermediate groove and a double arrow that indicates arrival, backward motion and the fact that the pencil or scriber is not to be raised.

In order to facilitate removal of the letter cards (61) from the window (67) of the mold (66), the same have recesses (79) in opposite areas of the periphery thereof, in which one's nails are introduced.

What is claimed:

1. A didactic-educational toy for elementary arithmetic operations, said toy comprising:

a plurality of transparent plates, each of said transparent plates having ten circular orifices, said orifices being distributed symmetrically in two rows, each row comprising five of said orifices, each of said orifices having substantially the same diameter;

a plurality of plates having cylindrical stepped protuberances, each of said protuberances having a base with a diameter corresponding to a diameter of the orifices of the transparent plates to provide for close-fitting insertion of said base into a corresponding one of said orifices, each of said protuberances having an upper portion having a diameter smaller than the diameter of its base to facilitate the insertion of the protuberance into a corresponding orifice;

said plurality of plates having cylindrical stepped protuberances including plates having a different number of protuberances, the surface area of each plate being substantially proportional to the number of protuberances, said plurality of plates having cylindrical stepped protuberances including at least a plurality of plates having only one protuberance and a plurality of plates having two protuberances.

2. The didactic-educational toy according to claim 1, wherein said plurality of plates having cylindrical stepped protuberances includes a plurality of plates having four protuberances.

3. The didactic-educational toy according to claim 1, wherein said plurality of plates having cylindrical stepped protuberances includes a plurality of plates with ten protuberances.

4. The didactic-educational toy according to claim 1, wherein said plurality of plates having cylindrical stepped protuberances includes plates having three, four five, six, seven, eight, nine and ten protuberances.

5. The didactic-educational toy according to claim 1, wherein each cylindrical stepped protuberance has a cylindrical through hole.

6. The didactic-educational toy according to claim 1, wherein some of said plates having cylindrical stepped protuberances include hollow spaces between said protuberances.

7. The didactic-educational toy according to claim 1, further including a plurality of small rectangular plates, each of said small rectangular plate having either two orifices or four orifices, a diameter of each of said orifices corresponds to a diameter of the base of the protuberances of the plates having cylindrical stepped protuberances, each of said small rectangular plates including indicia representing the arithmetic sign "+".

8. The didactic-educational toy according to claim 1, wherein each one of said transparent plates includes a colored perimetric strip.

9. The didactic-educational toy according to claim 1, wherein the plates having cylindrical stepped protuberances include small rectangular recesses distributed symmetrically along the contour of said plates.

10. The didactic-educational my according to claim 1, wherein the plates having cylindrical stepped protuberances include, in their bottom surfaces, cylindrical recesses, one cylindrical recess being disposed in correspondence with each cylindrical stepped protuberance, a diameter of each cylindrical recess corresponding to a diameter of the upper portion of the cylindrical stepped protuberance such that the upper portion of a cylindrical stepped protuberance on one plate is insertable into the cylindrical recess of another plate, thereby providing for stackability of the plates.

11. The didactic-educational toy according to claim 1, wherein the cylindrical stepped protuberances include diametric cuts.

12. The didactic-educational toy according to claim 1, further including a plurality of reading and writing chips, each of said writing chips representing a letter, said plurality of reading and writing chips comprising a first group of chips corresponding to consonants and having a first shape, and a second group of chips corresponding to vowels and having a second shape different from said first shape, the chips being interconnectable.

13. The didactic-educational toy according to claim 12, further including a plurality of molds having recesses corresponding to corresponding chips, each mold including a side wing and a recess for coplanar coupling between the molds, each mold further including a top wing.

14. The didactic-educational toy according to claim 12, wherein each chip has a front surface including a pair of horizontal protuberances and a back surface including horizontal grooves corresponding to said protuberances, thereby providing for stackability of the chips.

15. The didactic-educational toy according to claim 1, wherein the bases of the cylindrical stepped protuberances are provided with diametrically opposed recesses, the toy further comprising x-shaped assembly parts having arched branches, said assembly parts having small inner protuberances in the ends of said arched branches, such that said assembly parts are connectable to the cylindrical stepped protuberances by fitting said small protuberances into said recesses.

\* \* \* \* \*

UNITED STATES PATENT AND TRADEMARK OFFICE
CERTIFICATE OF CORRECTION

PATENT NO. : 5,599,188
DATED : February 4, 1997
INVENTOR(S) : Manuel LEMOS MELENDEZ It is certified that error appears in the above-indentified patent and that said Letters Patent is hereby corrected as shown below:

On the title page item [63], Related U.S. Application Data, change "PCT/RS94/00030" to --PCT/ES94/00030--.

Signed and Sealed this

Twenty-ninth Day of April, 1997

Attest:

BRUCE LEHMAN

Attesting Officer

Commissioner of Patents and Trademarks